United States Patent
House

(10) Patent No.: US 6,277,792 B1
(45) Date of Patent: Aug. 21, 2001

(54) VISCOSIFIED AQUEOUS FLUIDS AND VISCOSIFIER THEREFOR

(75) Inventor: Roy F. House, Houston, TX (US)

(73) Assignee: Venture Innovations, Inc., Lafayette, LA (US)

( * ) Notice: Subject to any disclaimer, the term of this patent is extended or adjusted under 35 U.S.C. 154(b) by 0 days.

(21) Appl. No.: 09/541,555

(22) Filed: Apr. 3, 2000

Related U.S. Application Data

(63) Continuation-in-part of application No. 09/222,293, filed on Dec. 28, 1998.

(51) Int. Cl.$^7$ .............. C09K 7/02; C08B 37/08; C07H 5/04
(52) U.S. Cl. ............ 507/110; 507/209; 507/211; 536/20; 536/55.3
(58) Field of Search .............. 536/20, 55.3; 507/110, 507/209, 211

(56) References Cited

U.S. PATENT DOCUMENTS

| | | | |
|---|---|---|---|
| 4,125,708 | * 11/1978 | Masri et al. | 536/20 |
| 5,021,207 | * 6/1991 | De Lucca et al. | 536/20 |
| 5,747,475 | * 5/1998 | Nordquist et al. | 536/20 |
| 5,777,091 | * 7/1998 | Kuhn et al. | 536/20 |
| 6,130,321 | * 10/2000 | Johnson et al. | 536/20 |

\* cited by examiner

*Primary Examiner*—Philip Tucker
(74) *Attorney, Agent, or Firm*—Roy F. House

(57) ABSTRACT

The present invention discloses a method of producing modified, derivatized chitosans which produce viscous aqueous liquids when dispersed (solublized) in compatible aqueous liquids. The method comprises reacting chitosan in an acidic solution with an aldehyde-group containing chemical modifier at an elevated temperature wherein the concentration of chitosan in the acidic solution and the reaction time at the elevated temperature are sufficient to produce a semi-solid gel. The preferred chemical modifier is one or more saccharides containing less than about 10 saccharide units, most preferably lactose. The preferred reaction temperature is greater than about 60° C., and the preferred concentration of chitosan is at least about 1.43% w/v. The invention also discloses the acidic chitosan-containing concentrates prepared by the method, and the viscous acidic fluids prepared by dispersing/solubilizing the concentrates in aqueous liquids.

24 Claims, No Drawings

VISCOSIFIED AQUEOUS FLUIDS AND VISCOSIFIER THEREFOR

The present patent application is a continuation-in-part application of co-pending patent application Ser. No. 09/222,293 filed Dec. 28, 1998 pending, incorporated herein by reference.

This invention was made with Government support under Award No. 976123 and Award No. DMI-9901868 awarded by the National Science Foundation. The Government has certain rights in this invention.

FIELD OF THE INVENTION

The invention pertains to the modification of chitosan to produce viscosifiers (thickeners, gellants) for aqueous liquids, and to viscosified aqueous fluids containing such modified chitosans dispersed therein.

BACKGROUND OF THE INVENTION

Many viscosifiers for, and methods of, increasing the viscosity of aqueous liquids are known. Such viscosifiers may be so-called water-soluble polymers such as biopolymers, gums, cellulose derivatives, alginates, and other polysaccharides or polysaccharide derivatives, and various synthetic polymers. Representative polymers are set forth in the book "Handbook of Water Soluble Gums and Resins," Robert L. Davidson, Ed., 1980.

Noticeably absent from this book is any mention of chitosan or derivatives thereof.

Viscoelastic fluids are characterized as having a rheological profile which is shear thinning, having a high viscosity at extremely low shear rates and a low viscosity at high shear rates. Thus such fluids are pseudoplastic having a high yield stress.

This type of rheology is produced by hydrating in the fluid certain water soluble polymers. These polymers presently known are biopolymers, i.e., microbially produced polysaccharides or heteropolysaccharides, and are well known in the art.

There is a need for fluids which exhibit a high low shear rate viscosity which are shear thinning.

Chitosan is a partially or fully deacetylated form of chitin, a naturally occurring polysaccharide. Structurally, chitin is a polysaccharide consisting of beta-(1→4)2-acetamido-2-deoxy-D-glucose units, some of which are deacetylated. The degree of deacetylation usually varies between 8 and 15 percent, but depends on the species from which the chitin is obtained, and the method used for isolation and purification.

Chitin is not one polymer with a fixed stoichiometry, but a class of polymers of N-acetylglucosamine with different crystal structures and degrees of deacetylation, and with fairly large variability from species to species. The polysaccharide obtained by more extensive deacetylation of chitin is chitosan.

Like chitin, chitosan is a generic term for a group of polymers of acetylglucosamine, but with a degree of deactylation of between 50 and 100 percent. Chitosan is the beta-(1-4)-polysaccharide of D-glucosamine, and is structurally similar to cellulose, except that the C-2 hydroxyl group in cellulose is substituted with a primary amine group in chitosan. The large number of free amine groups (pKa= 6.3) makes chitosan a polymeric weak base. Both chitin and chitosan are insoluble in water, dilute aqueous bases, and most organic solvents. However, unlike chitin, chitosan is soluble in dilute aqueous acids, usually carboxylic acids, as the chitosonium salt. Solubility in dilute aqueous acid is therefore a simple way to distinguish chitin from chitosan.

Chitosan is unique in that it is a polysaccharide containing primary amine groups. Chitosan forms water-soluble salts with many organic and inorganic acids.

It is known to prepare chitosan derivatives by attaching various groups to one or more hydroxyl groups of the chitosan, as in various cellulose derivatives, and/or in attaching various groups to the primary amino group of chitosan. Thus it is disclosed in Hall and Yalpani U.S. Pat. No. 4,424,346 that chitosan can be reacted with various aldehydes by Schiff base formation with the primary amino group. The reaction is conducted in the presence of a reducing agent, specifically sodium cyanoborohydride, to reduce the imino group formed to a secondary amino group, i.e., the chitosan undergoes reductive alkylation. Among the aldehyde reactants are aldose or ketose sugars, or sugars oxidizable or hydrolyzable to aldoses or ketoses, for example, glucose, galactose, arabinose, xylose, N-acetylglucosamine, lactose, cellobiose, maltose, and melibiose. Example 5 specifically discloses the reductive alkylation of chitosan with lactose at weight ratios of lactose/chitosan of 2.4 (Product A), 3.0 (Product B, Product C), and 6.0 (Product D), to form products having the group—NHR' therein, where R' is an aldose or ketose residue. When the reaction was carried out in the absence of the sodium cyanoborohydride reducing agent at a weight ratio of lactose/chitosan of 8.0, the resulting product was minimally reacted with a degree of substitution of only 0.1. The reactions were carried out at room temperature. A paper which discusses the preparation and characteristics of the chitosan derivatives set forth in the Hall et al. U.S. Pat. No. 4,424,346 is "Some Chemical and Analytical Aspects of Polysaccharide Modifications. 3. Formation of Branched-Chain, Soluble Chitosan Derivatives," M. Yalpani and L. D. Hall, MACROMOLECULES 1984, 17, 272–281. These chitosan derivatives are disclosed to offer a wide range of solubility, gelling and compatibility properties.

SUMMARY OF THE INVENTION

I have now determined that acidic viscous fluids having enhanced low shear rate viscosity (hereinafter sometimes referred to as ELSRV) can be prepared by dispersing in aqueous liquids certain acidic chitosan-containing concentrates (hereinafter sometimes referred to as ACCC).

The ACCC are prepared by reacting acidic chitosan salts in aqueous solution with an aldehyde group-containing chemical modifier (hereinafter sometimes referred to as AGCCM) at an elevated temperature wherein the concentration of chitosan in the acidic solution and the reaction time at the elevated temperature are sufficient to produce a semi-solid gel.

The preferred AGCCM are aldose or ketose sugars, or sugars oxidizable or hydrolyzable to aldoses or ketoses, such as glucose, galactose, arabinose, xylose, N-acetylglucoamine, lactose, cellobiose, maltose, and melibiose, or oligomers of the monosaccharides thereof containing from two to ten combined sugar units, of the same or different monosaccharides.

Preferably the concentration of chitosan in the ACCC is at least about 5 ppb (1.43 w/v %), the AGCCM to chitosan weight ratio is greater than about 0.5, and the reaction temperature is greater than about 140° F. (60° C.).

It is an object of this invention to provide a process for the preparation of acidic chitosan-containing concentrates which are efficient thickeners (viscosifiers, gellants) for compatible aqueous liquids to provide aqueous liquids having an elevated low shear rate viscosity.

It is another object of this invention to provide acidic chitosan-containing concentrates which are efficient thickeners (viscosifiers, gellants) for compatible aqueous liquids to provide aqueous liquids having an elevated low shear rate viscosity.

It is still another object to provide aqueous liquids which exhibit an elevated low shear rate viscosity having dispersed in a compatible aqueous liquid the acidic chitosan-containing concentrates of this invention.

These and other objects of the invention will be apparent to one skilled in the art upon reading the specification and claims hereof.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

The chitosans useful in the present invention will have at least 50% of their amino groups deacetylated, i.e., the degree of deacetylation is at least 50%, preferably at least 70%, and most preferably from about 85% to about 100%.

One aspect of the invention is to prepare aqueous pseudoplastic fluids having a Brookfield 0.5 rpm viscosity (hereinafter sometimes referred to as "low shear rate viscosity" or "LSRV") of at least about 10,000 centipoise and a shear thinning index (hereinafter sometimes referred to as "STI") greater than about 10. The STI is the ratio of the Brookfield viscosity at 0.5 rpm to the Brookfield viscosity at 100 rpm and is an indication of the shear thinning, pseudoplastic characteristic of the fluids.

Such aqueous pseudoplastic fluids are prepared by dispersing in a compatible aqueous liquid an acidic chitosan-containing concentrate prepared by reacting chitosan in an acidic aqueous solution with an aldehyde group-containing chemical modifier at an elevated temperature wherein the concentration of chitosan in the acidic solution and the reaction time at the elevated temperature are sufficient to produce a semi-solid gel.

A wide variety of acids can be used to solublize the chitosan in the concentrates. Such acids include inorganic acids such as hydrochloric acid, nitric acid, and sulfamic acid, and water soluble organic acids represented by the formula: R—(COOH)$_n$ wherein n has a value of 1 to 3 and R represents a mono- or divalent organic radical composed of carbon, hydrogen, and optionally at least one of oxygen, nitrogen, and sulfur. Exemplary organic acids are the mono- and dicarboxylic acids selected from the group consisting of formic, acetic, N-acetylglycine, acetylsalicylic, fumaric, glycolic, iminodiacetic, itaconic, lactic, citric, maleic, malic, nicotinic, 2-pyrrolidone-5-carboxylic, salicylic, succinamic, succinic, ascorbic, aspartic, glutamic, glutaric, malonic, pyruvic, sulfonyldiacetic, thiodiacetic, thioglycolic acids and mixtures thereof.

The preferred acid used to prepare the acidic chitosan solution is selected from the group consisting of (a) carboxylic acids containing from one to three carbon atoms, (b) substituted carboxylic acids containing at least one radical per molecule selected from the group consisting of hydroxyl, arnino, chloro, and thio, and containing from one to three carbon atoms, (c) hydrochloric acid, and (d) mixtures thereof.

The concentration of acid should be sufficient to decrease the pH of the solution to less than about 5.5, preferably 4.5 or less.

The preferred aldehyde group-containing chemical modifier is a saccharide of aldose or ketose sugars. Preferably the sugar is selected from the group consisting of arabinose, galactose, glucose, mannose, xylose, and mixtures thereof. The saccharide contains from one to about ten combined sugar units.

The preferred oligosaccharide is lactose, a disaccharide containing one glucose sugar unit and one galactose sugar unit per molecule. Other suitable oligosaccharides include such disaccharides as dextrose, maltose, melibiose, and cellobiose.

A mixture of oligosaccharides (hereinafter sometimes referred to as "OSM") useful in the present invention is obtained from the thermal hydrolysis of lignocellulose materials. The thermal hydrolysis may be carried out in any one of several manners such as by subjecting wood of trees and woody materials of corn stalks, cane, and other vegetable growths to the action of steam under elevated temperatures and pressures. The OSM may also be obtained by acid hydrolysis of lignocelluloses as well as by saccharification of wood. Preferably, however, the thermal hydrolysis is carried out by charging wood chips to a closed chamber (e.g., a gun as set forth in Mason U.S. Pat. No. 1,824,221, incorporated herein by reference), subjecting the chips to pressure of about 200–1200 pounds per square inch and a temperature of about 200–300° C. for approximately 30 minutes to 5 seconds, respectively, in the presence of steam, and then discharging the woody material from the gun through a constricted discharge means therein into a zone of lower pressure, preferably atmospheric pressure, thereby exploding the wood chips into comparatively finely divided elongated fibers. Under this treatment the wood undergoes hydrolysis, and water-insoluble and readily hydrolyzable constituents thereof are rendered soluble or dispersible in water. These water solubles are removed from the fiber, which may be accomplished by washing the fiber in water or by squeezing the fiber with rolls and/or screws and the like apparatus. See for example Boehm U.S. Pat. No. 2,224,135, incorporated herein by reference. The water solubles can be concentrated or rendered solid by removing water therefrom, as by evaporation, drying, etc.

Water solubles resulting from such hydrolysis of lignocellulose materials as a class are applicable to this invention. A typical analysis of the water solubles, the OSM of this invention, made from pine wood is as follows: hexosans, 40% by weight; pentosans, 30% by weight; lignin, 15% by weight; non-sugar carbohydrates, 10% by weight; and gums, 5% by weight. The constituents of the OSM will vary somewhat depending on the type of lignocellulose material hydrolyzed and the conditions, e.g., time, temperature, pressure, etc. Depending upon these conditions, the constituents of the OSM can vary roughly as follows: pentosans and hexosans, 60–80% by weight; lignin, 5–25% by weight; non-sugar carbohydrates, 5–15% by weight; and gums, 2–8% by weight. From the above description it will be seen that the major proportion of the water solubles consists of carbohydrate material. A more detailed analysis of the water solubles has indicated that the carbohydrate mixture is composed of oligosaccharides consisting of mannose, arabinose, glucose, galactose, and xylose sugar units. The crude water solubles from which relatively all of the suspended material has been removed consists almost entirely of the above described oligosaccharide mixture. There is a relatively small fraction present, about up to about 15% thereof, of monosaccharides. A larger fraction of the dissolved solids, i.e., greater than about 50% thereof, consists of hexose and pentose oligosaccharides containing from 2 to 5 of the corresponding monosaccharide sugar units which are predominantly those named above. The remainder of the dissolved solids has been found to consist of oligosaccharides having more than about 6 sugar units of the same 5 and 6 carbon monosaccharides. In most instances, the filter water solubles contain only from about 3 to about 5% of lignin.

Other oligosaccharide mixtures useful in the practice of this invention include cane syrup solids, corn solubles, and the like.

Thus in its broadest aspects, the aldehyde group-containing chemical modifier is composed of pentosans and/or hexosans containing from one to about ten combined sugar units, the sugar units preferably selected from the group consisting of arabinose, mannose, galactose, glucose, xylose, and mixtures thereof.

Preferably the AGCCM to chitosan weight ratio is greater than about 0.5. When the AGCCM is lactose, it is preferred that the lactose/chitosan weight ratio is greater than about 1.5.

As indicated, the acidic chitosan-containing concentrates are prepared by dispersing or solubilizing the chitosan in an acidic aqueous solution, mixing therewith an aldehyde group-containing chemical modifier, and thereafter heating the concentrate at an elevated temperature wherein the concentration of chitosan in the concentrate and the time at the elevated temperature are sufficient to produce a semi-solid gel.

Preferably the reaction temperature is greater than about 60° C. (140° F.).

The reaction time should generally vary inversely with the temperature, that is, as the temperature increases the reaction time decreases. A reaction time of at least about five hours, preferably at least about ten hours should be sufficient at temperatures from about 140° F. to about 185° F.

The chitosan concentration in the ACCC should be at least about 5 ppb (1.43% w/v). At lower concentrations, the concentrates do not provide efficient acidic thickeners (viscosifiers, gellants). The upper limit of chitosan concentration is dependent on the mixing equipment used to prepare the concentrate. As the chitosan concentration increases, the viscosity of the ACCC increases. The viscosity actually decreases on adding the AGCCM to the chitosan dispersion/solution such that the upper limit of chitosan concentration is dependent upon the mixing equipment used to disperse or dissolve the chitosan in the aqueous liquid. Generally concentrations of chitosan of about 15 ppb (4.3% w/v) or less can be mixed with high shear mixers.

The invention also comprises viscous acidic liquids comprising an aqueous liquid having solublized or dispersed therein the ACCC set forth herein. The concentration of the ACCC will be that amount sufficient to provide the viscous acidic liquid with the desired viscosity. Additional acid can be added if the acid concentration provided by the ACCC is not as low as desired. A base can be added to elevate the pH if the acid concentration provided by the ACCC is greater than the pH desired in the viscous acidic liquid. The viscous acidic liquids of this invention preferably exhibit a Brookfield 0.5 rpm viscosity of at least about 10,000 centipoise and a shear thinning index greater than about 10.

The acidic chitosan-containing concentrates and the aqueous fluids prepared therefrom will find many uses where water soluble polymers and chitosan derivatives have been used. Thus the ACCC will find uses: in protein precipitation in the production of animal feeds; as a flocculant in wastewater treatment; as a precipitant in the clarification of beer, wine and fruit juices; in seed coating; as a cosmetic ingredient such as in skin creams, hair treatments, after shaves and the like; in adhesives; in binders; in coatings; in aqueous film-forming formulations; in chelation formulations; in pharmaceuticals; in polysaccharide foams such as those set forth in Eagles et al. U.S. Pat. No. 5,840,777; as additives to oil and gas well drilling fluids, workover fluids, completion fluids, spacer fluids, fracturing fluids, acidizing fluids, sand control fluids, packer fluids, and the like; dust and emission control fluids; fire fighting fluids including viscous foam fluids; riot control fluids; and in other uses where polymers are used.

If desired the chitosan/saccharide derivatives can be reduced with reducing agents such as sodium cyanoborohydride, sodium borohydride, and the like as is well known in the art.

In order to more completely describe the invention, the following non-limiting examples are given. In these examples and in this specification, the following abbreviations may be used: w/v=weight/volume; g=gram; cp=centipoise; hr=hour; ppb=pounds per 42 gallon barrel; OS=off-scale; PV=API plastic viscosity in centipoise; YP=API yield point in pounds per 100 square feet; rpm=revolutions per minute; API=American Petroleum Institute; LSRV=low shear rate viscosity in centipoise as determined with a Brookfield Viscometer at 0.5 rpm; STI=the shear thinning index obtained with a Brookfield Viscometer, which is the ratio of the 0.5 rpm viscosity to the 100 rpm viscosity; GAA=glacial acetic acid; ELSRV=enhanced low shear rate viscosity; OSM=oligosaccharide mixture obtained from thermally hydrolyzed wood; ACCC=acidic chitosan-containing concentrate; and AGCCM=aldehyde group-containing chemical modifier.

EXAMPLE I

To 350 g of water in a 6-speed Hamilton Beach blendor jar were added 10.0 g of chitosan and 10.0 g of glacial acetic acid. This was mixed for one minute at the lowest speed. The concentration of OSM (100% solids basis) set forth in Table 1 was then added and the mixing continued for three minutes. Thereafter the concentrates were placed in pint jars, sealed, and aged for 16 hours at the temperature set forth in Table 1.

After cooling, the concentrates were evaluated as viscosifiers by adding sufficient of the concentrate to 280 g of water to produce fluids containing 2.0 ppb (0.57 w/v %) chitosan and mixing in the 6-speed Hamilton Beach blendor at the lowest speed for three minutes. The viscosity of the resulting fluids were evaluated with a model RVT Brookfield Viscometer at 0.5 rpm and 100 rpm. The data obtained are set forth in Table 1.

EXAMPLE II

Additional concentrates and fluids were prepared and evaluated as in Example I. The composition of the concentrates and the fluids, and the data obtained are set forth in Table 2.

EXAMPLE III

Concentrates and fluids were prepared and evaluated as in Example I, except that the chitosan was reacted with lactose as a replacement for the OSM. The composition of the concentrates and the fluids, and the data obtained are set forth in Table 3. After measuring the viscosities of the fluids, the fluids were re-mixed with 5 ppb soda ash, and the viscosities again obtained. The data are set forth in Table 3.

EXAMPLE IV

Additional concentrates and fluids were prepared and evaluated as in Example III. The composition of the concentrates and the fluids, and the data obtained are set forth in Table 4.

EXAMPLE V

A concentrate having the composition of Concentrate C-18 except containing 20 g of glacial acetic acid was aged at 140° F. (60° C.) for 21 hours. The concentrate is a viscous, pourable fluid. A fluid containing 82 g of the concentrate and 280 g of water was prepared as in Table 4, the fluid thus containing 2 ppb chitosan, 4 ppb glacial acetic acid, and 6 ppb lactose. This fluid was a clear, yellow fluid having 0.5 rpm and 100 rpm Brookfield viscosities of 200 and 79 cp, respectively. After the addition of 8 ppb soda ash to the fluid, the pH was 9.2 and the 0.5 rpm and 100 rpm Brookfield viscosities were 200,000 and 7,800 cp respectively. The remainder of the concentrate was aged for 15 hours at 163° F. (73° C.). A firm gel was obtained. A fluid was prepared as above (82 g of concentrate in 280 g of water) to produce a viscous clear fluid having 0.5 rpm and 100 rpm Brookfield viscosities of 215,000 and 6,130 cp respectively.

EXAMPLE VI

For comparison, fluids were prepared directly containing 1.5 ppb chitosan, 3.0 ppb glacial acetic acid, and 0 or 4.5 ppb lactose. The Brookfield and Fann rheology was obtained before and after aging the fluids at 181° F. (82.8° C.) for 15 hours. The data obtained are set forth in Table 5. Concentrates containing 10 ppb chitosan, 20 ppb glacial acetic acid, and 0 or 30 ppb lactose were prepared. One-half of each concentrate was aged at room temperature and one-half was aged at 181° F. (82.8° C.) for 15 hours. Fluids were prepared from these concentrates having the same composition as the fluids set forth above. The Brookfield and Fann viscosities are set forth in Table 5.

EXAMPLE VII

Concentrate C-18, Table 4, was disposed in water at 3.85 ppb chitosan and the Brookfield viscosities obtained. Thereafter this fluid was diluted with water to give the concentrations set forth in Table 6. The viscosities obtained are set forth in Table 6.

EXAMPLE VIII

A concentrate containing 350 g water, 10.0 g of glacial acetic acid, 10.0 g of chitosan, and 30.0 g of pure cane syrup (66% solids) was prepared as in Example I and aged 15 hours at 181° F. A fluid was prepared containing 60.0 g of the gelled concentrate in 298 g of water as in Example I. Thus the fluid contained 1.5 ppb (0.43 w/v %) chitosan. The Brookfield RVT Viscometer rheology was as follows: 0.5 rpm =160,000 cp; 100 rpm=4200 cp; STI=38. The fluid had a pH of 4.3.

EXAMPLE IX

A concentrate containing 175 g of water, 10.0 g of glacial acetic acid, 5.0 g of chitosan, and 7.5 g of lactose was prepared as in Example I and aged 15 hours at 181° F. A fluid was prepared from the gelled concentrate by mixing 93 g of the concentrate with 424 g of a 70% isopropanol/30% water solution. Thus the fluid contained 0.45 w/v % chitosan in a solution containing 58.6 w/v % isopropanol and 41.4 w/v % water. The Brookfield rheology was as follows: 0.5 rpm= 86,000 cp; 100 rpm=1680 cp; STI=51.

The data in the examples indicate that acidic chitosan concentrates containing an aldehyde group-containing chemical modifier can be prepared at elevated temperatures to provide efficient thickeners (viscosifiers, gellants) for aqueous liquids. The fluids prepared from the concentrates exhibit very enhanced viscosities as compared to fluids similarly prepared from concentrates containing no aldehyde group-containing chemical modifier, or to fluids prepared from concentrates containing low concentrations of chitosan, and/or at temperatures of about 140° F. or less. Thus the concentration of chitosan in the concentrate is preferably at least about 5 ppb (1.43% w/v) and the minimum reaction temperature is preferably greater than about 140° F. (60° C.). The data further indicate that the weight ratio of the aldehyde-group containing chemical modifier to chitosan is preferably greater than about 0.5. When the chemical modifier is lactose, the weight ratio of lactose to chitosan is preferably greater than about 1.5.

In Tables 1, 2, 3, and 4, concentrates A, B, and C are not examples of the invention since they were not semi-solid, non-flowable gels.

TABLE 1

| Concentrate | A | C-1 | C-2 | C-3 | C-4 | C-5 |
|---|---|---|---|---|---|---|
| Water, g | 350 | 350 | 350 | 350 | 350 | 350 |
| Chitosan 98-32, g | 10 | 10 | 10 | 10 | 10 | 10 |
| GAA, g | 10 | 10 | 10 | 10 | 10 | 10 |
| OSM, g | 0 | 14.25 | 17.1 | 17.1 | 19.95 | 22.8 |
| Aged 16 hr @ ° F. Fluid | 150 | 150 | 157 | 150 | 150 | 150 |
| Water, g | 280 | 280 | 280 | 280 | 280 | 280 |
| Concentrate, g | 74 | 79 | 80 | 81 | 81 | 82 |
| (Chitosan, ppb) | (2) | (2) | (2) | (2) | (2) | (2) |
| (GAA, ppb) | (2) | (2) | (2) | (2) | (2) | (2) |
| (OSM, ppb) | (0) | (2.85) | (3.42) | (3.42) | (4.0) | (4.56) |
| Brookfield Viscosities | | | | | | |
| 0.5 rpm, cp | 320 | 63,600 | 183,200 | 141,000 | 96,000 | 57,000 |
| 100 rpm, cp | 109 | 986 | 3,900 | 1,926 | 2,260 | 1,470 |
| STI | 3 | 65 | 47 | 73 | 42 | 39 |

TABLE 2

| Concentrate | A | C-6 | C-7 | C-8 | C-9 |
|---|---|---|---|---|---|
| Water, g | 350 | 350 | 350 | 350 | 350 |
| Chitosan 98-32, g | 10 | 10 | 10 | 10 | 10 |
| GAA, g | 10 | 10 | 10 | 10 | 10 |
| OSM, g | 0 | 5.7 | 8.55 | 11.4 | 17.1 |
| Aged 16hr @ ° F. | 150 | 190 | 150 | 190 | 150 |

TABLE 2-continued

| Concentrate | A | C-6 | C-7 | C-8 | C-9 |
|---|---|---|---|---|---|
| Fluid | | | | | |
| Water, g | 280 | 280 | 280 | 280 | 280 |
| Concentrate, g | 74 | 76 | 77 | 78 | 80 |
| (Chitosan, ppb) | (2) | (2) | (2) | (2) | (2) |
| (GAA, ppb) | (2) | (2) | (2) | (2) | (2) |
| (OSM, ppb) | (0) | (1.14) | (1.71) | (2.28) | (3.42) |
| Brookfield Viscosities | | | | | |
| 0.5 rpm, cp | 100 | 82,400 | 106,800 | 85,000 | 118,000 |
| 100 rpm, cp | 48 | 2,080 | 1,940 | 3,700 | 3,100 |
| STI | 2 | 40 | 55 | 23 | 38 |

TABLE 3

| Concentrate | A | C-10 | C-11 | C-12 | C-13 | C-14 |
|---|---|---|---|---|---|---|
| Water, g | 350 | 350 | 350 | 350 | 350 | 350 |
| Chitosan 98-630, g | 10 | 10 | 10 | 10 | 10 | 10 |
| GAA, g | 10 | 10 | 10 | 10 | 10 | 10 |
| Lactose, g | 0 | 5 | 10 | 15 | 20 | 30 |
| Aged, °F./Hr | 150/16 | 163/26 | 163/26 | 163/26 | 190/16 | 180/16 |
| Fluid | | | | | | |
| Water, g | 280 | 280 | 280 | 280 | 280 | 280 |
| Concentrate, g | 74 | 75 | 76 | 77 | 78 | 80 |
| (Chitosan, ppb) | (2) | (2) | (2) | (2) | (2) | (2) |
| (GAA, ppb) | (2) | (2) | (2) | (2) | (2) | (2) |
| (Lactose, ppb) | (0) | (1) | (2) | (3) | (4) | (6) |
| Brookfield Viscosities | | | | | | |
| 0.5 rpm, cp | 100 | 200 | 2,000 | 1,400 | 108,000 | 128,000 |
| 100 rpm, cp | 48 | 83 | 470 | 261 | 2,100 | 5,300 |

TABLE 3-continued

| Concentrate | A | C-10 | C-11 | C-12 | C-13 | C-14 |
|---|---|---|---|---|---|---|
| STI | 2 | 2 | 4 | 5 | 51 | 24 |
| With 5 ppb Soda Ash | | | | | | |
| 0.5 rpm, cp | 100 | 11,500 | 210,000 | 170,000 | 140,000 | — |
| 100 rpm, cp | 76 | 400 | 6,950 | 782 | — | — |
| STI | 1 | 29 | 30 | 217 | — | — |

TABLE 4

| Concentrate | B | C | C-15 | C-16 | C-17 | C-18 | C-19 |
|---|---|---|---|---|---|---|---|
| Water, g | 350 | 350 | 350 | 350 | 350 | 350 | 350 |
| Chitosan 98-630, g | 5 | 5 | 5 | 7.5 | 7.5 | 10 | 12.5 |
| GAA, g | 10 | 10 | 20 | 10 | 10 | 10 | 20 |
| Lactose, g | 15 | 30 | 15 | 22.5 | 30 | 30 | 37.5 |
| Aged at 183° F./16 hr | | | | | | | |
| Fluid | | | | | | | |
| Water, g | 210 | 210 | 210 | 257 | 257 | 280 | 294 |
| Concentrate, g | 146 | 152 | 156 | 104 | 106 | 80 | 67.2 |
| (Chitosan, ppb) | (2) | (2) | (2) | (2) | (2) | (2) | (2) |
| (GAA, ppb) | (4) | (4) | (8) | (2.7) | (2.7) | (2) | (3.2) |
| (Lactose, ppb) | (6) | (12) | (6) | (6) | (8) | (6) | (6) |
| Brookfield Viscosities | | | | | | | |
| 0.5 rpm, cp (×10⁻³) | 0.15 | 0.20 | 440 | 268 | 184 | 200 | 120 |
| 100 rpm, cp (×10⁻³) | 0.98 | 0.98 | 12.8 | 3.9 | 3.66 | 12.4 | 11.4 |
| STI | 2 | 2 | 34 | 69 | 50 | 16 | 11 |
| With 8 ppb Soda Ash, pH = 8.9 | | | | | | | |
| 0.5 rpm, cp (×10⁻³) | 280 | 160 | | | | | |
| 100 rpm, cp (×10⁻³) | 9.6 | 1.2 | | | | | |
| STI | 29 | 133 | | | | | |

TABLE 5

| | Fluids Prepared Directly | | Fluids Prepared from Concentrates | |
|---|---|---|---|---|
| Chitosan 98-630, ppb | 1.5 | 1.5 | 1.5 | 1.5 |
| GAA, ppb | 3.0 | 3.0 | 3.0 | 3.0 |
| Lactose, ppb | 0 | 4.5 | 0 | 4.5 |
| | Fluids Aged 15 hr @ R.T. | | Concentrates aged 15 hr @ R.T. | |
| Brookfield Visc. | | | | |
| 0.5 rpm, cp | 200 | 150 | 200 | 200 |
| 100 rpm, cp | 120 | 124 | 118 | 112 |
| Fann Viscosity | | | | |
| 600 rpm | 69 | 70 | 67 | 63 |
| 300 rpm | 45 | 46 | 44 | 41 |
| PV | 24 | 24 | 23 | 22 |
| YP | 21 | 22 | 21 | 19 |
| | Fluids Aged 15 hr @ 181° F. | | Concentrates Aged 15 hr @ 181° F. | |
| Brookfield Visc. | | | | |
| 0.5 rpm, cp | 100 | 100 | 100 | 120,000 |
| 100 rpm, cp | 44 | 43 | 40 | 4,950 |
| Fann Viscosity | | | | |
| 600 rpm | 23 | 20 | 21 | OS |
| 300 rpm | 12 | 10 | 11 | OS |
| PV | 11 | 10 | 10 | — |
| YP | 1 | 0 | 1 | — |

TABLE 6

| | Chitosan 98-630 | | Brookfield Viscosity, cp | | |
|---|---|---|---|---|---|
| Fluid | ppb | % w/v | 0.5 rpm | 100 rpm | STI |
| C-18-1 | 3.85 | 1.10 | 1,000,000 | >40,000 | — |
| C-18-2 | 2.89 | 0.83 | 640,000 | 25,500 | 25 |
| C-18-3 | 2.40 | 0.69 | 308,000 | 15,300 | 20 |
| C-18-4 | 1.925 | 0.55 | 220,000 | 10,400 | 21 |
| C-18-5 | 1.44 | 0.41 | 165,000 | 5,700 | 29 |
| C-18-6 | 0.96 | 0.27 | 112,000 | 2,820 | 40 |

What is claimed is:

1. A method of producing an acidic viscosifier concentrate for aqueous solutions comprising reacting chitosan in an acid-containing acidic solution with an aldehyde group-containing chemical modifier at an elevated temperature greater than about 60° C. wherein the concentration of chitosan in the acidic solution and the reaction time at the elevated temperature are sufficient to produce a semi-solid gel.

2. The method of claim 1 wherein the chemical modifier is selected from the group consisting of monosaccharides, oligosaccharides containing less than about ten saccharide units, and mixtures thereof.

3. A method of producing an acidic viscosifier concentrate for aqueous solutions comprising reacting chitosan in an acid-containing acidic solution with an aldehyde group-containing modifier selected from the group consisting of lactose, cellobiose, the water solubles resulting from the thermal hydrolysis of lignocelulose materials, and mixtures thereof, at an elevated temperature wherein the concentration of chitosan in the acidic solution and the reaction time at the elevated temperature are sufficient to produce a semi-solid gel.

4. The method of claim 1 wherein the modifier is lactose.

5. The method of claim 3 wherein the modifier is lactose.

6. The method of claim 3 wherein the temperature is greater than about 60° C.

7. The method of claim 1 wherein the concentration of chitosan is at least about 5 ppb (1.43% w/v).

8. The method of claim 2 wherein the concentration of chitosan is at least about 5 ppb (1.43% w/v).

9. The method of claim 3 wherein the concentration of chitosan is at least about 5 ppb (1.43% w/v).

10. The method of claim 4 wherein the concentration of chitosan is at least about 5 ppb (1.43% w/v).

11. The method of claim 5 wherein the concentration of chitosan at least about 5 ppb (1.43% w/v).

12. The method of claim 6 wherein the concentration of chitosan is at least about 5 ppb (1.43% w/v).

13. The method of claim 1 wherein the acidic solution has a pH less than about 4.5.

14. The method of claim 2 wherein the acidic solution has a pH less than about 4.5.

15. The method of claim 3 wherein the acidic solution has a pH less than about 4.5.

16. The method of claim 7 wherein the acidic solution has a pH less than about 4.5.

17. The method of claim 8 wherein the acidic solution has a pH less than about 4.5.

18. The method of claim 9 wherein the acidic solution has a pH less than about 4.5.

19. The method of claim 6 wherein the acidic solution has a pH less than about 4.5.

20. The method of claim 12 wherein the acidic solution has a pH less than about 4.5.

21. A viscous acidic liquid comprising an aqueous liquid having dispersed therein the acidic viscosifier concentrate of claim 1, 2, 4, 7, 10, 13, or 16.

22. An acidic chitosan-containing concentrate prepared by the process of claim 1, 4, 7, 10, 13, or 16.

23. A viscous acidic liquid comprising an aqueous liquid having dispersed therein the acidic viscosifier concentrate of claim 3, 5, 6, 9, 11, 12, 15, 18, 19, or 20.

24. An acidic chitosan-concentrate prepared by the process of claim 3, 5, 6, 9, 11, 12, 15, 18, 19, or 20.

* * * * *